Sept. 13, 1927.

G. CONSTANTINESCO

UNIDIRECTIONAL DRIVING DEVICE

Filed Dec. 31, 1926

INVENTOR
G. CONSTANTINESCO,
BY

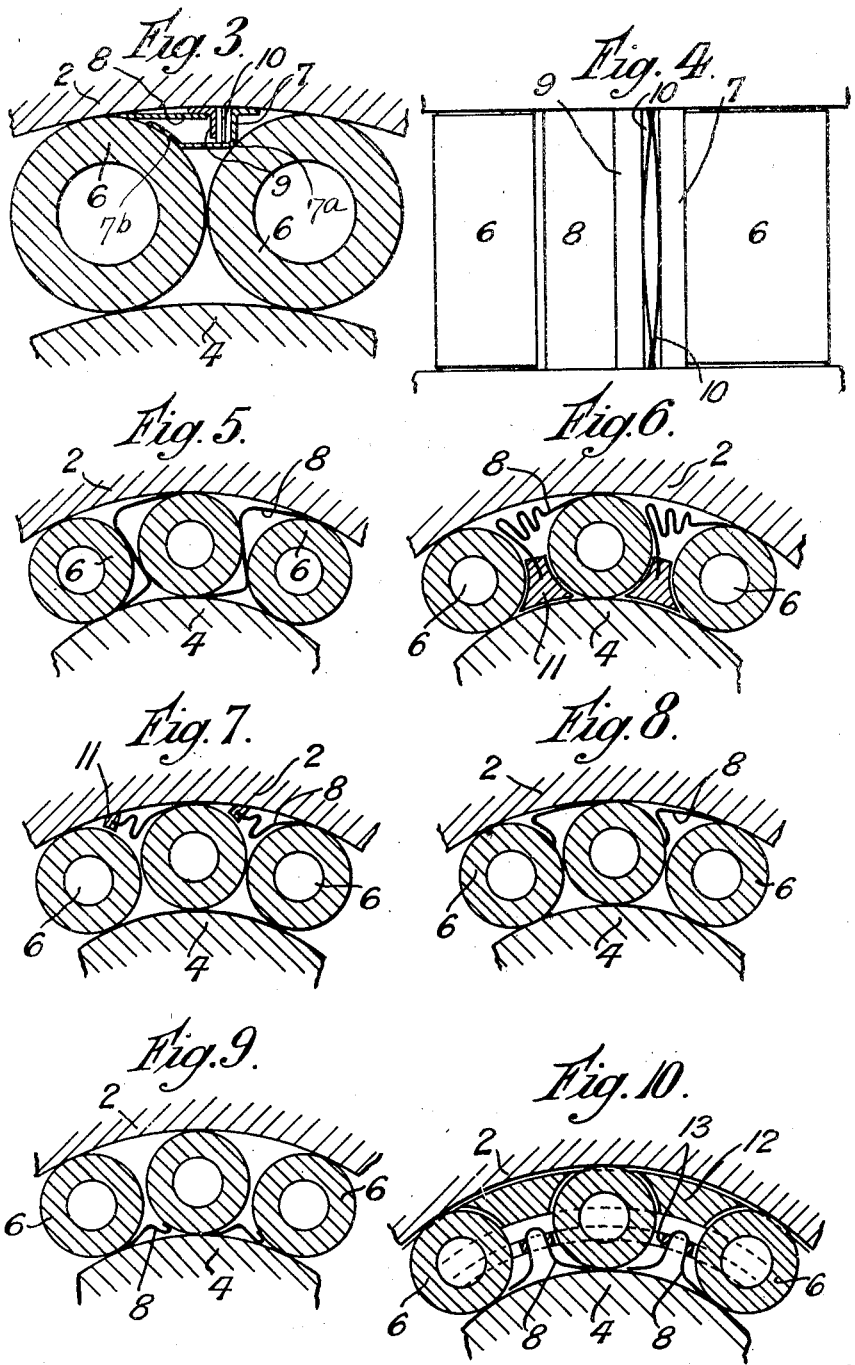

Patented Sept. 13, 1927.

1,642,645

UNITED STATES PATENT OFFICE.

GEORGE CONSTANTINESCO, OF WEYBRIDGE, ENGLAND.

UNIDIRECTIONAL DRIVING DEVICE.

Application filed December 31, 1926, Serial No. 158,263, and in Great Britain February 26, 1926.

The invention relates to the adaptation of ordinary ball or roller bearings as unidirectional driving devices, and it consists in introducing thin elastically influenced strips of metal or other material into the bearing in such a way that when one of the races is turned in one direction relative movement of the parts aided by the elasticity of, or applied to the strips tends to draw in the strips between the balls or rollers and one or both of the adjacent races, which thus become locked together. Motion in the opposite direction releases this locking. Oscillating motion is communicated to one of the races, the other constituting, or being connected with, a unidirectional rotor. The device is mainly intended for high frequencies and the frequency of the oscillator may be as high as 500 oscillations per second.

The invention may be carried into effect in many ways, and it may be applied either to roller or ball bearings, though it is more suitable for the former. In what follows the application to roller bearings will be described, but the application to ball bearings will be understood.

In the accompanying drawings:—

Figure 3 is a section to an enlarged scale of part of Figure 2.

Figure 4 is a plan of Figure 3.

Figures 5 to 9 are diagrams showing modified arrangements.

Figure 10 shows in diagram a reversible form of the device.

Figure 1:
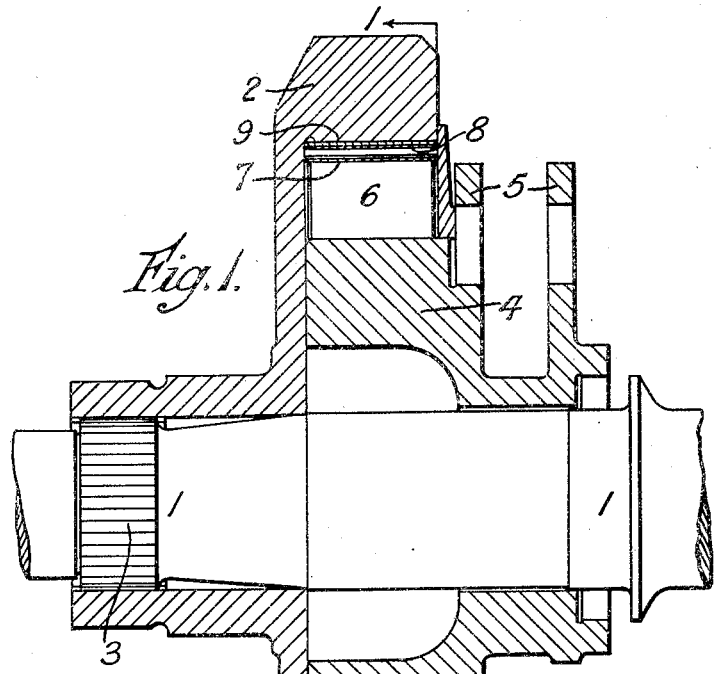
Figure 1 is a sectional elevation of a unidirectional driving device embodying the invention.
Figure 2:
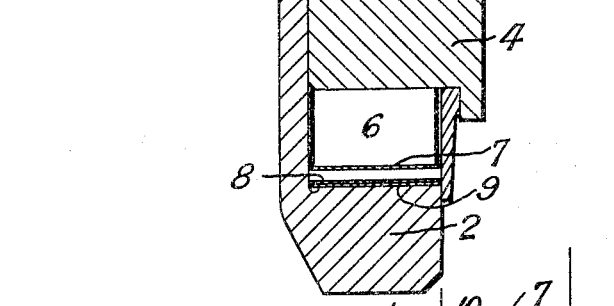
Figure 2 is a quarter view section on the line 1—1 of Figure 1.
Figure 2:
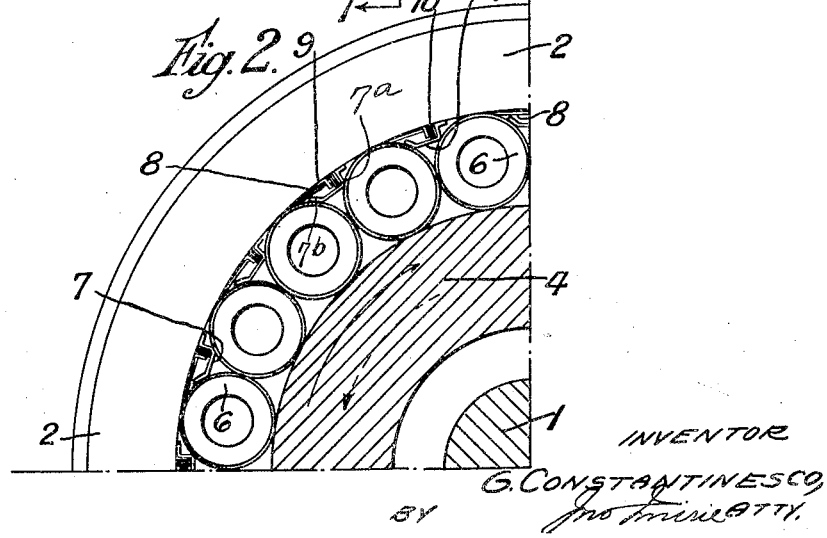

Referring to Figures 1 to 4, 1 is a shaft to which unidirectional motion is given by a rotor 2 which is mounted upon it and connected to it by any suitable means, such as a splined surface 3. 4 is an oscillating member loosely mounted on the shaft 1 adjacent to the rotor and occupying a cavity therein. The oscillator is provided with suitable means, such as lugs 5, for connecting it to means, not shown, for imparting oscillatory motion to it. The adjacent concentric faces of the oscillator and rotor form a space occupied by rollers 6 which are packed close together. In the space between pairs of adjacent rollers and the rotor are situated metal trays 7 shaped as shown, each tray having a shoulder 7ᵃ which rests on one roller and a curved part 7ᵇ which rests on the adjacent roller. The trays are occupied by thin hard steel blades 8 which are formed with sharp edges so as to enter the spaces between the rollers and the rotor. The opposite edges of the blades are provided with flanges 9 which may be of a different material and soldered or otherwise secured to the blades. Between the flanges and the radial parts of the trays are leaf springs 10 which press the sharp edges of the blades into the spaces between the rollers and the rotor. The effect is that the oscillator can turn freely in the direction of the curved dotted arrow, but when rotated in the opposite direction shown by the heavy arrow, the blades cause the rollers to grip the oscillator and the rotor which thus turn together. On the return motion—again in the direction of the dotted arrow—the rollers disengage themselves and the oscillator can turn freely without influencing the rotor.

In the form of the invention shown in Figure 5, an elastic strip 8 of thin steel plate is bent into S or Z section, and a strip thus formed is introduced between each pair of rollers 6, so that the edges tend by the elasticity of the strip to force themselves in between the rollers and the faces of the oscillator and rotor. One edge of a strip engages with a roller, and, say, the oscillator, while the other edge engages with an adjacent roller and the rotor. When the oscillator moves, the rollers, strips, oscillator and rotor, are locked together when the motion is in one direction, but are free on the return stroke. It is obviously immaterial which of the parts 2 or 4 acts as oscillator or rotor.

In another form, shown in Figure 6, one edge of each strip 8 is secured to a rod or bar 11 of approximately trapezium section having suitably curved faces to enable the bar to act as a distance piece between adjacent rollers. The strip is bent or crumpled to increase its resilience, and its free edge tends to force itself between a roller 6 and either of the adjacent faces of the oscillator or rotor. In another arrangement, shown in Figure 7, the bar lies in the angular space between one roller and one face, while the free edge of the strip lies in the opposite corresponding space between the next roller and the same face. In yet a third form, shown in Figures 8 and 9, one edge of the strip is bent or folded and takes the place of the bar.

The above are examples of the application to unidirectional non-reversible driving. A reversible device is shown in Figure 10. The strips 8 are of bridge section with the free edges splayed out so as to enter the spaces between two adjacent rollers and the face of either oscillator or rotor. The rollers are kept apart by distance pieces or bars 12 which may be connected together to form a grid. A second grid having bars 13 of smaller section embraces each of the metal strips near its middle, and can be moved so as to restrain the strips in either direction at will. According to the position of this grid one or the other edge of each strip is kept out of action, and the drive takes place in one direction. The direction of the drive can be reversed by changing the direction of restraint. 2 and 4 may represent either the oscillator or the rotor.

Thin sheet metal is a suitable material for the strips. If the dimensions of the bearing are such that the rollers are in contact with both races at the same time, a suitable thickness is 1/100 of the diameter of the rollers, if, as in all the above examples except that shown in Figure 5, the strips engage with the rollers at one end only of a diameter. If, as in the example shown in Figure 5, they engage with the rollers at both ends of a diameter, their thickness should be half this, or 1/200 of the diameter. These dimensions are of course only approximate and depend upon the coefficient of friction between the materials used. For example, the strips may be made of fibre, in which case the thickness would be greater. The rollers may, however, be a loose fit between the races, in which case the above dimensions must naturally be increased by an amount approximating to the difference between the diameters of the rollers and the difference between the radii of the races, or half this in the case of the first example.

The resilience of the strips causes them to take up wear automatically, so that there is practically no back-lash, but efficient lubrication with a very thin lubricant is essential. For instance, a mixture of petroleum lamp oil and ordinary mineral oil is suitable. When worn the strips are easily replaceable.

What I claim is:—

1. A unidirectional driving device comprising a shaft, a unidirectionally driven rotor member fixed thereon in such a way as to impart to it rotary motion, an oscillating member rotatably mounted on the said shaft concentrically with the rotor member, an annular space being left between the rotor and oscillating members, rolling antifriction bodies situated in said space and in contact with the surfaces of the rotor and oscillating members, and thin blades pressed by spring action in such a manner that they tend to interpose themselves between the antifriction bodies and the adjacent surface, thus causing the antifriction bodies and the rotor and oscillating members to bind together when the oscillating member is turned in one direction and to be released when the oscillating member is turned in the opposite direction.

2. In a unidirectional driving device as claimed in claim 1, leaf springs which apply pressure to the blades.

3. In a unidirectional driving device as claimed in claim 1, flanges upon the said blades and leaf springs which apply pressure to the said flanges.

4. In a unidirectional driving device as claimed in claim 1, flanges upon the said blades, leaf springs which apply pressure to the said flanges, and trays situated in the spaces between the said antifriction bodies and the adjacent surface of the said rotor member, which trays are adapted to contain the said blades and springs and to act as abutments for the springs.

In testimony that I claim the foregoing as my invention I have signed my name this sixth day of December, 1926.

GEORGE CONSTANTINESCO.